US009118667B2

(12) United States Patent
Rosati et al.

(10) Patent No.: US 9,118,667 B2
(45) Date of Patent: Aug. 25, 2015

(54) SYSTEM AND METHOD FOR ACCESSING PRIVATE NETWORKS

(75) Inventors: Anthony Rosati, Ottawa (CA); Scott Alexander Vanstone, Campbellville (CA); Mark E. Pecen, Waterloo (CA)

(73) Assignees: BlackBerry Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 227 days.

(21) Appl. No.: 13/487,055

(22) Filed: Jun. 1, 2012

(65) Prior Publication Data

US 2013/0046976 A1 Feb. 21, 2013

Related U.S. Application Data

(60) Provisional application No. 61/493,272, filed on Jun. 3, 2011.

(51) Int. Cl.
H04L 29/06 (2006.01)
H04L 9/32 (2006.01)
H04W 12/06 (2009.01)

(52) U.S. Cl.
CPC .......... *H04L 63/0853* (2013.01); *H04L 9/3271* (2013.01); *H04W 12/06* (2013.01); *H04L 63/0272* (2013.01); *H04L 63/083* (2013.01)

(58) Field of Classification Search
CPC ......................... H04L 9/3271; H04L 63/0869
USPC .......................................................... 713/168
See application file for complete search history.

(56) References Cited

U.S. PATENT DOCUMENTS

| 6,880,079 | B2 * | 4/2005 | Kefford et al. ................. 713/155 |
| 6,983,381 | B2 * | 1/2006 | Jerdonek ............................ 726/5 |
| 7,328,030 | B2 | 2/2008 | Laursen et al. |
| 2002/0095507 | A1 | 7/2002 | Jerdonek |
| 2004/0187018 | A1 | 9/2004 | Owen et al. |

(Continued)

FOREIGN PATENT DOCUMENTS

| EP | 1806934 A1 | 11/2007 |
| WO | WO 02/19593 A2 | 3/2002 |
| WO | WO 2010/128451 A2 | 11/2010 |

OTHER PUBLICATIONS

Siddiqui, I.; Search Report from corresponding PCT Application No. PCT/CA2012/050373; search completed Oct. 25, 2012.
M'Raihi, David et al.; "OCRA: OATH Challenge-Response Algorithms"; draft-mraihi-mutual-oath-hotp-variants-09.txt; Jul. 2009; Internet Engineering Task Force (IETF); IETF standard working draft.

(Continued)

*Primary Examiner* — Longbit Chai
(74) *Attorney, Agent, or Firm* — Jon Gibbons; Fleit Gibbons Gutman Bongini & Bianco P.L.

(57) ABSTRACT

A system and method are provided for using a mobile device to authenticate access to a private network. The mobile device may operate to receive a challenge from an authentication server, the challenge having being generated according to a request to access a private network; obtain a private value; use the private value, the challenge, and a private key to generate a response to the challenge; and send the response to the authentication server. An authentication server may operate to generate a challenge; send the challenge to a mobile device; receive a response from the mobile device, the response having been generated by the mobile device using a private value, the challenge, and a private key; verify the response; and confirm verification of the response with a VPN gateway to permit a computing device to access a private network.

22 Claims, 11 Drawing Sheets

(56) References Cited

U.S. PATENT DOCUMENTS

| | | |
|---|---|---|
| 2004/0268142 A1 | 12/2004 | Karjala et al. |
| 2004/0268148 A1 | 12/2004 | Karjala et al. |
| 2009/0158048 A1 | 6/2009 | Kim et al. |
| 2009/0172397 A1 | 7/2009 | Kim |
| 2010/0075633 A1 | 3/2010 | Lydike et al. |
| 2010/0191960 A1 | 7/2010 | Beck et al. |

OTHER PUBLICATIONS

Oliveira, Joel; Supplementary European Search Report from corresponding European Application No. 12793701.9; search completed Oct. 24, 2014.

* cited by examiner

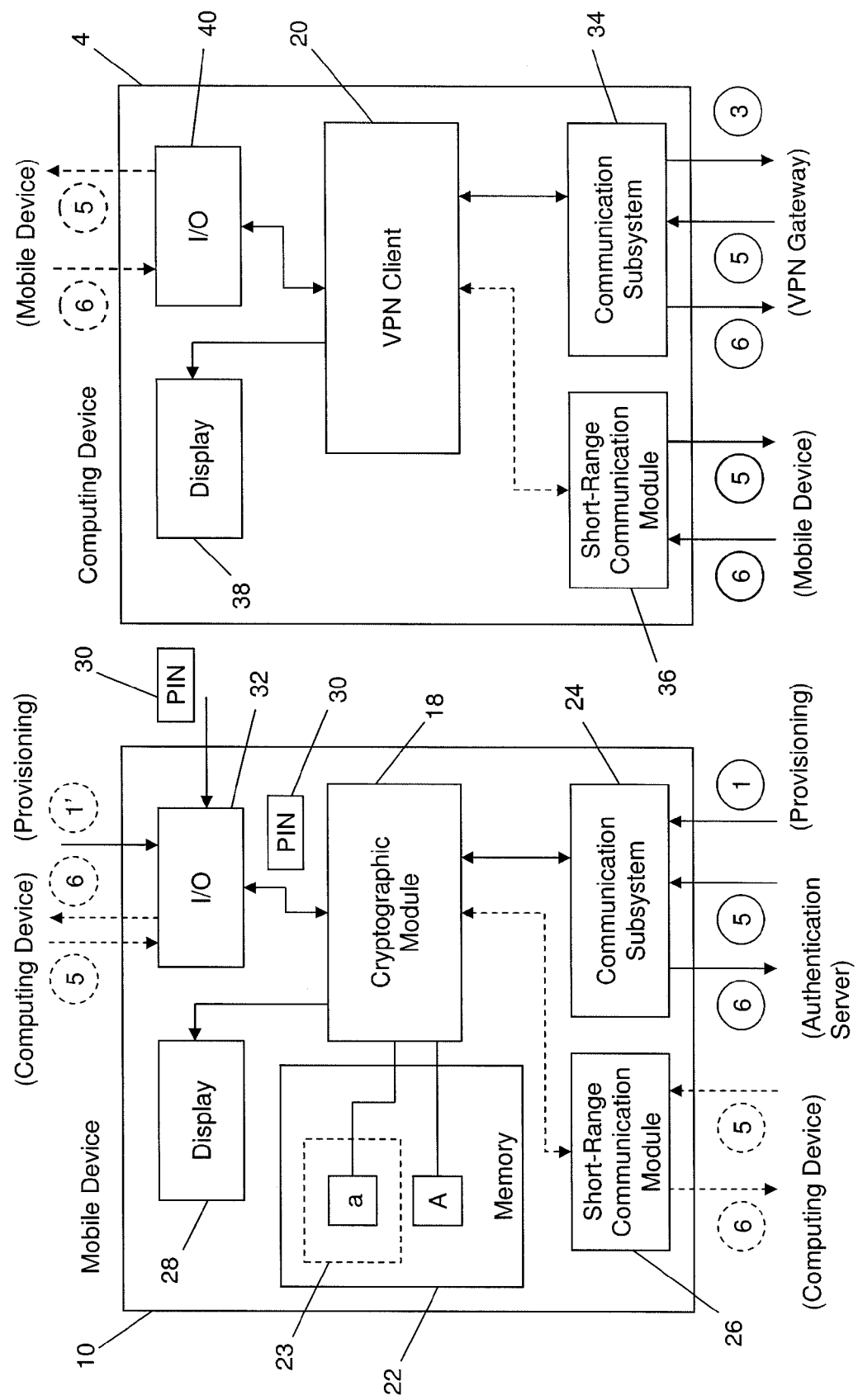

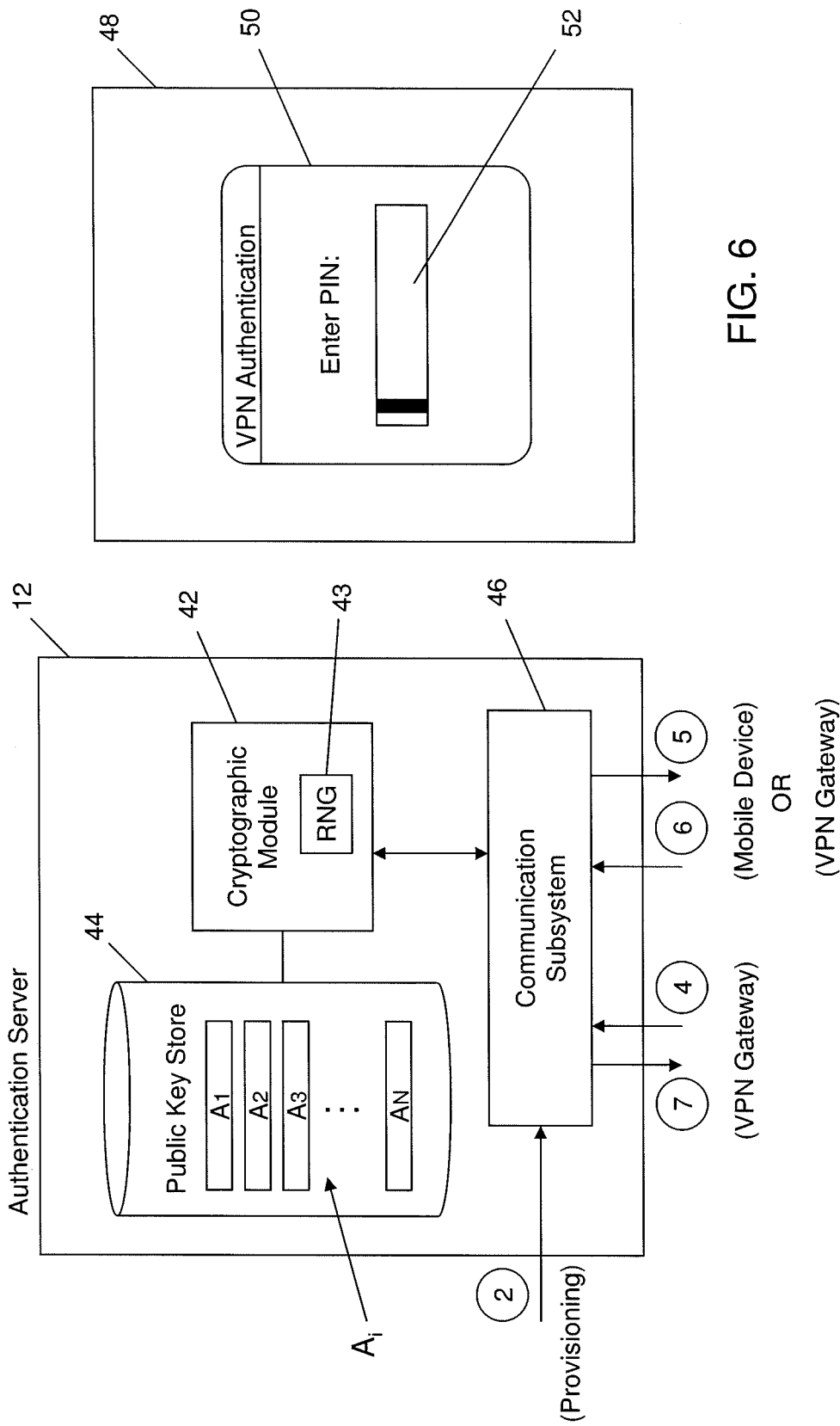

SYSTEM AND METHOD FOR ACCESSING PRIVATE NETWORKS

This application claims priority to U.S. Provisional Patent Application No. 61/493,272 filed on Jun. 3, 2011, the contents of which are incorporated herein by reference.

TECHNICAL FIELD

The following relates to systems and methods for accessing private networks.

DESCRIPTION OF THE RELATED ART

A two factor authentication scheme refers to a cryptographic authentication scheme that utilizes something possessed by the entity being authenticated, "something you have", as well as something known to that entity, "something you know". For example, a user may possess a secure device or client application on a personal device, and know a private or personal value such as a personal identification number (PIN). The secure device may include a token or other physical component that, for example, displays a rolling value. The rolling value may also be displayed by a client application running, for example, on a smart phone. The RSA SecurID® system provided by RSA Security Inc. is an example of a commercially available system that utilizes a two factor authentication scheme. Two factor authentication schemes are particularly popular for enabling users to remotely access a private network such as a virtual private network (VPN) hosted by an enterprise, including but not limited to, internet protocol security (IPSec) and transport layer security (TLS) based VPNs. In order to be authenticated, a user enters both a PIN and a current value displayed by the token. In addition to having to be in possession of both the token and the PIN, there are typically two steps required to enter the requisite values. Moreover, the rolling value is typically refreshed after a relatively short, predetermined amount of time and, thus, the amount of time available to enter the current value displayed by the token is limited and can be prone to input error or becoming out-of-sync.

Typical two factor authentication schemes require an authentication server, e.g. within the enterprise, and each user that wishes to gain access to the VPN carries the token and is given or otherwise chooses a password, PIN, or other private value. When the user initiates a VPN client on his/her computer, a secure channel is established with a VPN gateway, which grants or denies access to the VPN. The user is then challenged on the computer to enter the value currently being displayed by the token, in addition to their PIN (i.e. two factors). The two factors entered by the user are then sent to the authentication server for verification. Once verified, the VPN gateway establishes a secure connection between the user's computer and the VPN.

In order to verify the user, the authentication server maintains the PIN associated with that user, and the state of the rolling value displayed by the token. This requires not only the storage of sensitive data, namely the PIN, but also requires the accurate maintenance of a rolling value for each and every user that is registered to access the VPN. In addition to the potential storage burden, the state of the token at the authentication server may become out-of-sync with that displayed by the secure device, in which case a resynchronization may be required.

BRIEF DESCRIPTION OF THE DRAWINGS

Embodiments will now be described by way of example only with reference to the appended drawings wherein:

FIG. 3 is a block diagram illustrating an example configuration for a mobile device.

FIG. 4 is a block diagram illustrating an example configuration for a computing device having a VPN client.

FIG. 5 is a block diagram illustrating an example configuration for an authentication server.

FIG. 6 is a screen shot of an example user interface (UI) for obtaining a PIN.

DETAILED DESCRIPTION

Figure 1:
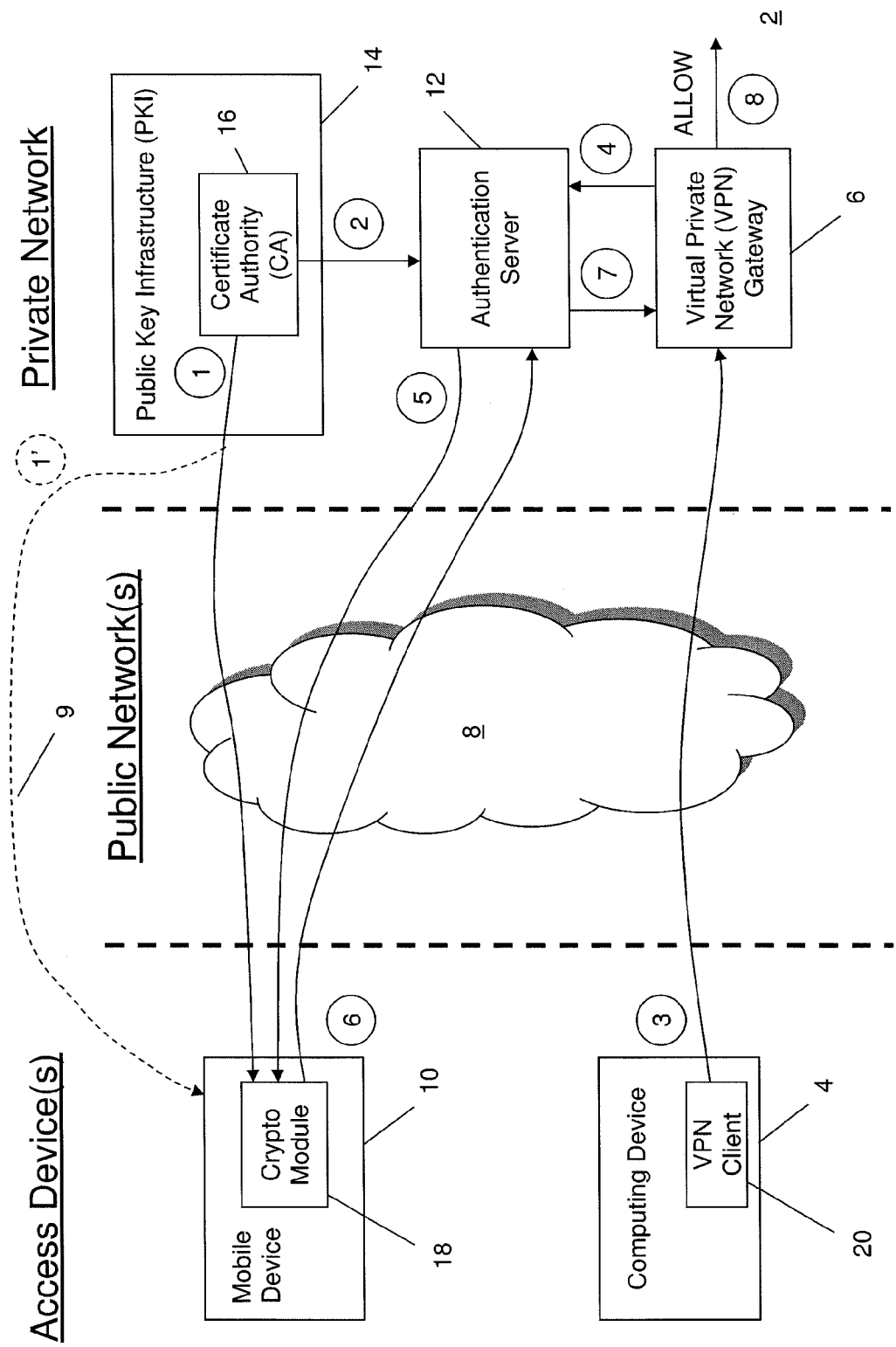
FIG. 1 is a schematic diagram of a communication system for accessing a private network using a mobile device accessible over a public network.

It has been recognized that in addition to having to both store a PIN and maintain a rolling value for each user registered to access a private network, an authentication server used in a two factor authentication scheme such as that described above can be vulnerable to security attacks. Not only is personal and/or private information stored by the authentication server, but an adversary able to gain access to the authentication server can access the rolling values either directly or by obtaining the seed used to generate the rolling values. In other words, should the authentication server be compromised, the security of the two factor authentication scheme can be diminished or lost.

To address the potential security issues with traditional two factor authentication schemes, a mobile communication device such as a smart phone or tablet computer can be used to access a private network by initiating a challenge/response protocol and having a challenge sent to the mobile communication device after receiving a request from a private network client (e.g. on the mobile communication device itself or another computing device such as a personal computer (PC), laptop, tablet computer, etc.). The response to the challenge may then be generated by the mobile communication device using the challenge, at least one private value provided by the mobile device, and a PIN obtained from an input. For example, the challenge may be signed using a private key and the PIN. It can be appreciated that various challenge/response protocols may be used, including one sided authentication protocols, wherein only the mobile device is authenticated, and mutual authentication protocols, wherein both the mobile device and an authentication server are authenticated.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

For clarity in the discussion below, mobile communication devices may be commonly referred to as "mobile devices" for brevity. Examples of applicable mobile devices may include, without limitation, cellular phones, smart-phones, wireless organizers, pagers, personal digital assistants, computers, laptops, handheld or other wireless communication devices, wirelessly enabled notebook computers, portable gaming devices, tablet computers, or any other portable electronic device with processing and communication capabilities.

FIG. 1 illustrates an example wherein a computing device 4, such as a PC, laptop, tablet, etc.; is used to remotely access a private network 2, such as an enterprise network; through a VPN gateway 6 accessed over a public network 8, such as the internet. In this example, a mobile device 10 is used to authenticate VPN access by being challenged by an authentication server 12. The mobile device 10 is provisioned with a private/public key pair (a, A) by a component in a public key infrastructure (PKI) 14, in this example a certificate authority (CA) 16 in the PKI 14. It can be appreciated that the key pair may be long term and may be changed periodically. The authentication server 12 is also provisioned by the CA 16 to have a copy of the public key A associated with each mobile device 10 registered to access the private network 2. The mobile device 10 includes or otherwise has access to a cryptographic (crypto) module 18, which may comprise software, hardware, or a combination thereof configured to perform cryptographic operations such as digital signature generation, digital signature verification, data encryption, data decryption, etc. The computing device 4 includes a VPN client 20 which is used to initiate access to the private network 2 by communicating with the VPN gateway 6 over the public network 8, to establish a secure channel therebetween.

It can be appreciated that any one or more of the PKI 14, authentication server 12, and VPN client 6 may be a component of an enterprise system which includes the private network 2. Similarly, although the PKI 14, authentication server 12, and VPN client 6 are shown separately in FIG. 1, such a configuration is for illustrative purposes only. For example, the authentication server 12 may be a component of the PKI 14, the authentication server 12 and VPN 6 may be hosted by the same server or computing infrastructure, etc. It can also be appreciated that the public network(s) 8 shown in FIG. 1 may represent any type of network, including wireless networks 8'' (see also FIG. 9) or wired networks 8' (see also FIG. 2). Access to the public network(s) 8 may also be provided according to various protocols and utilizing various interfaces, for example, a wide area network (WAN), a local area network (LAN), a personal area network (PAN), direct wired, or wireless link.

FIG. 1 illustrates an example of a method for authenticating access to a private network using a mobile device 10. At stage 1, a private/public key pair (a, A) is provisioned on the mobile device 10. It can be seen in FIG. 1 that this may be done over a public network 8, e.g. according to a cryptographic key transport protocol, or may be performed out-of-band, e.g. directly by an information technology (IT) administrator in an enterprise, at the time of manufacture, etc. (i.e. stage 1' shown in dashed lines). At stage 2, the public key A of the private/public key pair (a, A) for the mobile device 10 provisioned in stage 1 is provided to the authentication server 12. It can be appreciated that there are various methods that may be employed to provide the authentication server 12 with the public keys. For example, a digital certificate issued by a CA 16 can be provided. It can be appreciated that the CA 16 could be part of an enterprise PKI (e.g. PKI 14), or externally generated. Alternatively, the authentication server 12 can be provided with an authenticated public key when a user initially requests access to the private network 2. It can also be appreciated that since the authentication server 12 only stores public keys of the mobile devices 10, even if the authentication server 12 is compromised, nothing more than public information is revealed. Moreover, to remove a user from the VPN and private network 2, the public key $A_i$ for that user can simply be removed from the authentication server 12. In this way, the user that has been deleted cannot be verified thereafter as the authentication server 12 will no longer have the public key.

At stage 3 shown in FIG. 1, the computing device 4 utilizes the VPN client 20 to request access to the private network 2 by communicating with the VPN gateway 6 over a public network 8 such as the internet to set up a secure channel (e.g. using a Diffie-Hellman key exchange protocol). The VPN gateway 6 after receiving such a request initiates an authentication of the associated user at stage 4 by communicating with the authentication server 12. The authentication server 12 initiates a challenge/response protocol and sends a cryptographic challenge at stage 5 to the mobile device 10 associated with the user making the request in stage 3. As discussed above, various challenge/response protocols may be used. In this example, the challenge may be a random number generated by the authentication server 12 or some other message which is not susceptible to a replay attack. In other examples, mutual authentication may be performed wherein both the mobile device 10 and the authentication server 12 contribute random numbers and time stamps. For example, a secure socket layer (SSL) protocol which supports a public key based mutual authentication may be used.

To respond to the challenge received from the authentication server 12, in this example, the cryptographic module 18 on the mobile device 10 obtains a PIN 30 from the user, e.g. by prompting the user on a display and accepting entry of the PIN 30 via a UI. It can be appreciated that the PIN 30 may be the same as that used to access the mobile device 10 when it has been "locked", or a different value. The cryptographic module 18 uses the entered PIN 30, and private value such as a private key a stored on the mobile device 10 in a secure location, to sign the challenge, and returns a response at stage 6, the response including the signed challenge. It can be appreciated that various cryptographic schemes can be used to sign the challenge and to verify the signature included in the response. For example, an elliptic curve cryptographic (ECC) scheme such as the Elliptic Curve Digital Signature Algorithm (ECDSA), the Elliptic Curve Pintsov-Vanstone (ECPV), or Elliptic Curve Diffie-Hellman (ECDH) signature mechanisms, can be used to provide high security with a relatively small signature size. The signature may include additional information, for example a transaction-specific value such as a time stamp to prevent replay attacks. The authentication server 12 receives the response and verifies the signature on the challenge. If the signature can be verified, the authentication server 12 confirms verification with the VPN gateway 6 at stage 7. The VPN gateway 6 then allows access to the private network 2 at stage 8.

It may be noted that the data flow illustrated by the stages shown in FIG. 1 simplifies the user experience since the user is only required to enter a PIN 30, i.e. the user does not need to enter an additional rolling value displayed on a token as in prior two factor methods. Instead, the cryptographic module 18 uses a value available to only the mobile device 10, e.g. a private key a stored on the mobile device 10, to provide the other authentication factor. In other words, by having the authentication server 12 send the challenge to the mobile device 10, the mobile device 10 enables a simple acknowledgement of the connection being requested in stage 3 through entry of the PIN 30. It may also be noted that as users become increasingly reliant on mobile devices 10, the mobile devices 10 are more likely to be with the user when such an authentication is needed. This avoids the need to carry an additional token or other secure device and enables the user to detect if an attack is being made, for example if an authentication challenge is received at a time when the user is not currently trying to access the private network 2.

Figure 2:
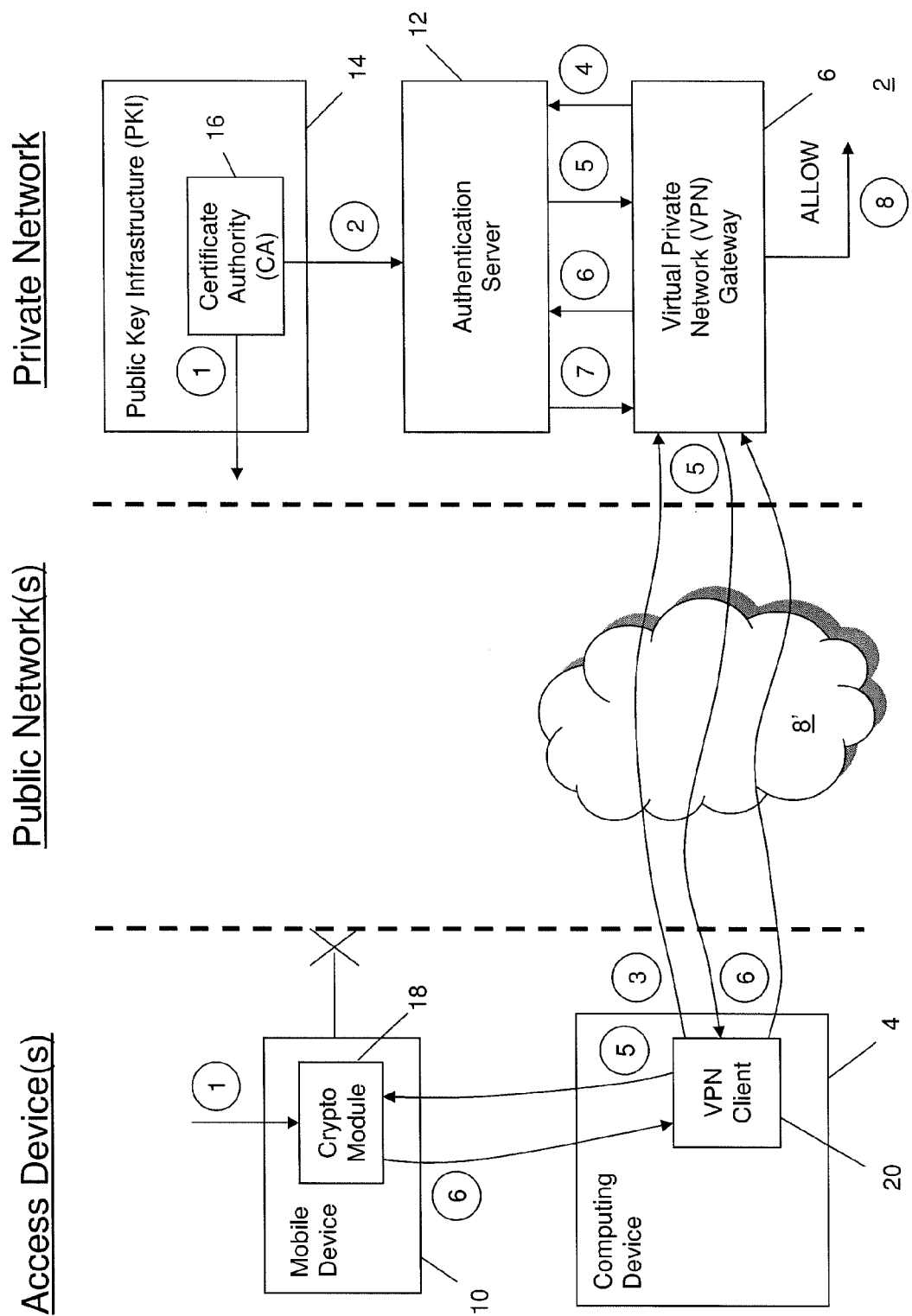
FIG. 2 is a schematic diagram of a communication system for accessing a private network using a mobile device inaccessible over a public network.

To enable a similar two factor authentication to proceed when the mobile device 10 is out-of-coverage or otherwise does not have access to a public network 8, a configuration such as that shown in FIG. 2 may be utilized. In the example shown in FIG. 2, it is assumed that the private/public key pair (a, A) has previously been provisioned at stage 1, and the public key provided to the authentication server 12 at stage 2. Similar to the example shown in FIG. 1, a request originating from the VPN client 20 on the computing device 4 at stage 3, initiates an authentication of the associated user by the VPN gateway 6 at stage 4. Instead of sending the challenge to the mobile device 10 via a wireless network 8", the challenge is sent at stage 5 to the VPN gateway 6 to be routed through the VPN client 20 to the cryptographic module 18 on the mobile device. It can be appreciated that a short range wireless or direct wired connection between the mobile device 10 and the computing device 4 (e.g. USB, Bluetooth, near field communication (NFC), etc.) can trigger the VPN client 20 to request that the VPN gateway 6 obtain the challenge instead of having the challenge sent to the mobile device 10 over a wireless network 8". In this way, the authentication server 12 does need to attempt to deliver the challenge over the wireless network 8" only to determine that the mobile device 10 is out-of-coverage. A flag, value or bit in a message sent from the VPN client 20 to the VPN gateway 6 can be used to indicate that the challenge and response are to be routed through the secure channel between the VPN client 20 and VPN gateway 6.

After receiving the challenge, the cryptographic module 18 on the mobile device 10 signs the challenge and generates the response at stage 6, e.g. in a manner similar to that described above, and returns the response to the authentication server 12 by sending the response to the VPN client 20 on the computing device 4 to enable the VPN client 20 to send the response over the secure channel established with the VPN gateway 6. The VPN gateway 6 routes the response to the authentication server 12 to enable the authentication server 12 to verify the signature on the challenge using the public key $A_i$ associated with the user. The authentication server 12 may then return a confirmation to the VPN gateway 6, that the signature has been verified at stage 7 (or a message indicating the signature has been rejected). The VPN gateway 6, assuming the signature has been successfully verified, allows access to the private network 2 at stage 8.

An example configuration for the mobile device 10 is shown in FIG. 3. The cryptographic module 18 includes or otherwise has access to at least a portion of memory 22. The memory 22 in this example stores the public key A and has a secure area 23 for storing the private key a. The cryptographic module 18 can therefore access both the private key a and the public key A for performing cryptographic operations utilizing such keys. The mobile device 10 in this example includes a display module 28 that enables the cryptographic module 18 to request entry of the PIN 30 through, for example, a UI. It can be appreciated that a PIN request can be performed in various other ways. For example, the mobile device 10 could use a non-visual notification such as a particular beep, tone, or flash indicative of the request to enter the PIN 30. The mobile device 10 also includes one or more input/output (I/O) modules 32 (one shown in FIG. 3 for ease of illustration). The I/O module 32 shown in FIG. 3 may represent any input mechanism such as a keyboard, shortcut key, data port, memory slot, etc. The mobile device 10 in the example configuration shown in FIG. 3 also includes a communication subsystem 24 for accessing a public network 8 and thus for sending and receiving data over the public network 8, e.g. wirelessly. The mobile device 10 may also include a short range communication module 26 which enables the mobile device 10 to establish a short-range connection with another device. For example, the short-range communication module 26 can be operable to establish and utilize a Bluetooth connection. It can be appreciated that a short-range wired connection may also be represented by the short-range communication module 26, e.g. a USB connection. As such, the I/O module 32 or short-range communication module 26 may generally represent any module on the mobile device 10 that is capable of enabling a direct wired or short-range wireless connection with the mobile device 10.

It can be seen in FIG. 3 that obtaining the private/public key pair (a, A) in stage 1 may be performed according to a communication made through the communication subsystem 24 (e.g. over-the-air as shown in FIG. 1), or may be performed through, for example, a direct connection with the I/O module 32 of the mobile device 10. Similarly, receipt of the challenge in stage 5 and provision of the response in stage 6 may be conducted using the communication subsystem 24 (e.g. over-the-air as shown in FIG. 1), or may be conducted using a short-range or direct communication link with the computing device 4 (e.g. as shown in FIG. 2).

An example configuration for a computing device 4 having a VPN client 20 is shown in FIG. 4. The computing device 4, in this example, includes a communication subsystem 34 for accessing a public network 8 to enable the VPN client 20 to request access to the private network 2 in stage 3. The communication subsystem 34 may also be used for receiving the challenge in stage 5 and sending the response in stage 6, e.g. as shown in the example shown in FIG. 2. The computing device 4 may also include a short-range communication module 36 for routing the challenge received in stage 5 to the mobile device 10, and for routing the response received from the mobile device 10 in stage 6 to the VPN gateway 6. As can be seen in FIG. 4, the VPN client 20 may also route the challenge and response in stages 5 and 6 through an I/O module 40, e.g. a direct wired connection. The computing device 38 may also include a display 38, e.g. for enabling a user to access the private network 2 through a UI.

An example configuration for an authentication server 12 is shown in FIG. 5. The authentication server 12 in this example includes a cryptographic module 42 that is configured or otherwise operable to at least participate in a challenge/response protocol by generating a challenge (e.g. using a random number generator (RNG) 43) and performing a signature verification operation using a public key associated with the user requesting access to the private network 2. The authentication server 12 also includes a public key store 44 for storing a public key $A_i$ associated with each user registered to access the private network 2 using a VPN client 20. The authentication server 12 also includes a communication subsystem 46 for communicating with either the mobile device 10 (e.g. over-the-air as shown in FIG. 1) or the VPN gateway 6 (e.g. as shown in FIG. 2) for sending a challenge, and receiving a response. The communication subsystem 46 may also be used to receive an authentication initiation request from the VPN gateway 6 at stage 4 and return a confirmation of verification or rejection of the response to the VPN gateway 6 at stage 7. It can be appreciated that a single communication subsystem 46 is shown in FIG. 5 for ease of illustration and that more than one subsystem could be used. For example, a wireless transceiver may be used to send the challenge to the mobile device 10 and receive the response from the mobile device 10, whereas an Ethernet or other wired connection using a different transceiver may be used to communication with the VPN gateway 6.

An example of a screen shot of a VPN authentication UI 50 displayed by a display 48 of the mobile device 10 is shown in FIG. 6. The authentication UI 50 is displayed in order to request entry of the PIN 30 in an entry box 52. It can be appreciated that the UI 50 shown in FIG. 6 may be displayed automatically after receiving the challenge, or may be launched using another mechanism such as a link in a message. For example, the challenge may be sent using an email, short message service (SMS) message, peer-to-peer (P2P) message (e.g. PIN-based message) or any other form of communication, whereupon selecting a link or option in the message, the UI 50 shown in FIG. 6 is displayed.

Figure 7:
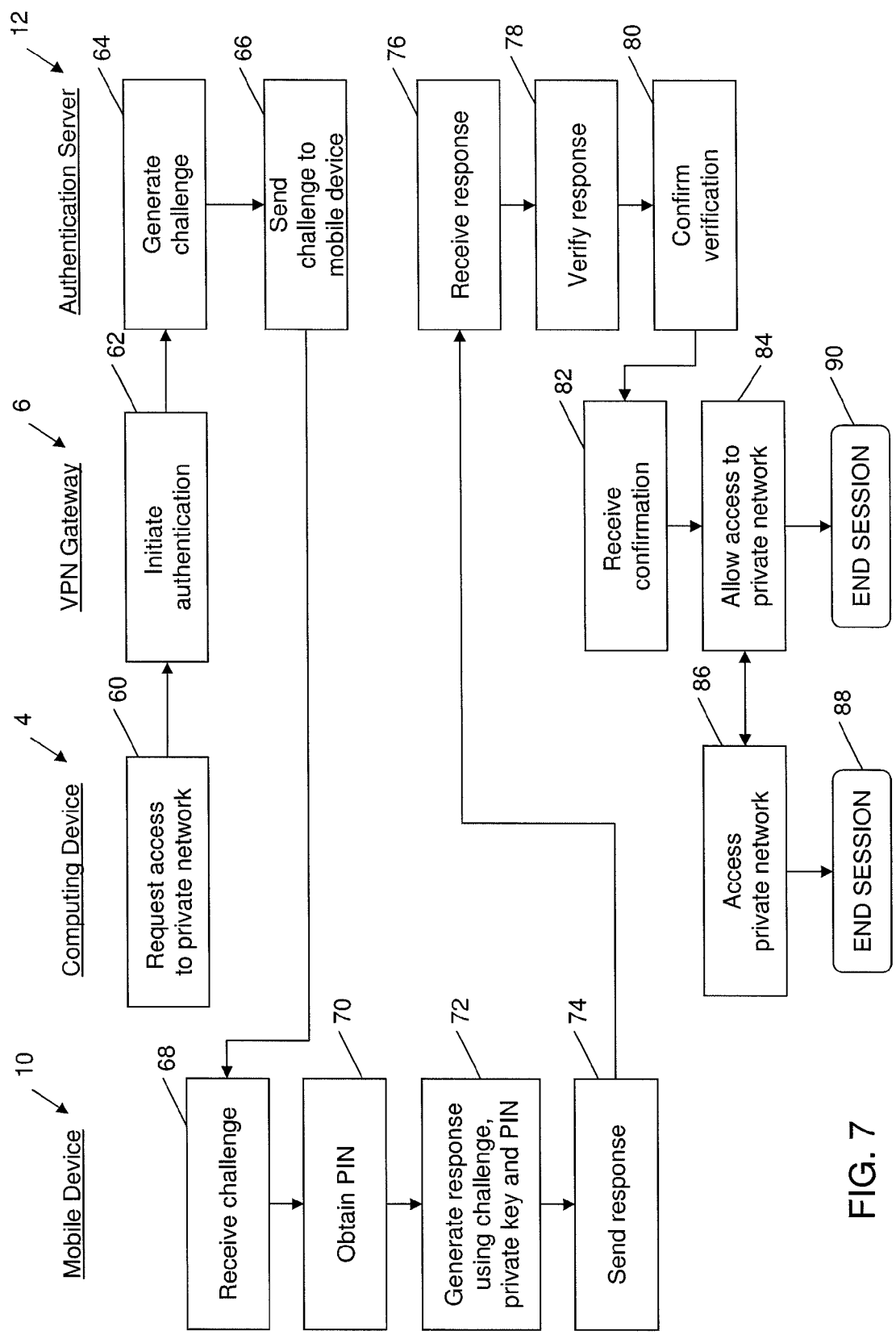
FIG. 7 is a flow chart illustrating an example set of computer executable operations that may be performed in authenticating access to a private network according to the communication system shown in FIG. 1.

Turning now to FIG. 7, an example of a set of computer executable operations is shown, that may be performed in authenticating access to a private network according to the communication system in FIG. 1. At 60, the VPN client 20 of the computing device 4 requests access to the private network 2. The VPN gateway 6 receives the request and in addition to establishing a secure channel with the VPN client 20, initiates authentication of a user associated with the request at 62. The authentication server 12 after detecting a request to initiate an authentication initiates a challenge/response protocol by generating a challenge at 64, e.g. by generating a random number. The authentication server 12 then sends the challenge over-the-air to the mobile device 10, and the mobile device 10 receives the challenge at 68. For example, as discussed above, a message or other data packet may be used to deliver the challenge to the mobile device 10.

The mobile device 10 after receiving the challenge at 68 obtains the PIN 30 from the user at 70, e.g. by requesting entry of the PIN 30 through the authentication UI 50. The cryptographic module 18 may then generate a response at 72 using the challenge, the private key a, and the PIN 30 obtained at 70. For example, the response may include a signature of the challenge, wherein the challenge is signed using the private key a and the PIN 30 and may include additional information such as a timestamp. It may also be the case that the PIN 30 is only used to give the mobile device 10 access to the cryptographic module instead of having it as part of the signed message. A message M to be signed in such an example, could include the challenge, a timestamp and, possibly, the PIN 30. For example, by using the ECDSA signature scheme the cryptographic module 18 does the following: generates a random integer k; computes R=kG=(x,y), where G is a generating point; computes r=x(mod n); and computes $s=k^{-1}\{h(M)+ra\}$ (mod n), where h is a hash function. The signature to be provided with or as the challenge comprises two components (r, s).

The response is then sent at 74 to the authentication server 12. The response is received by the authentication server 12 at 76, and the response is verified at 78 by the cryptographic module 42 on the authentication server 12. For example, the signature on the challenge may be verified using a verification scheme that is complementary to the signing scheme used by the cryptographic module 18 on the mobile device 10 (e.g. an ECDSA verification scheme). If the response can be verified at 78, the authentication server 12 may then confirm the verification with the VPN gateway 6 at 80. The VPN gateway 6 after receiving such confirmation at 82 allows access to the private network 2 at 84 for the user authenticated using the mobile device 10. The VPN client 20 may then access the private network 2 at 86 and such access may persist until the session ends at 88 and 90.

Figure 8:
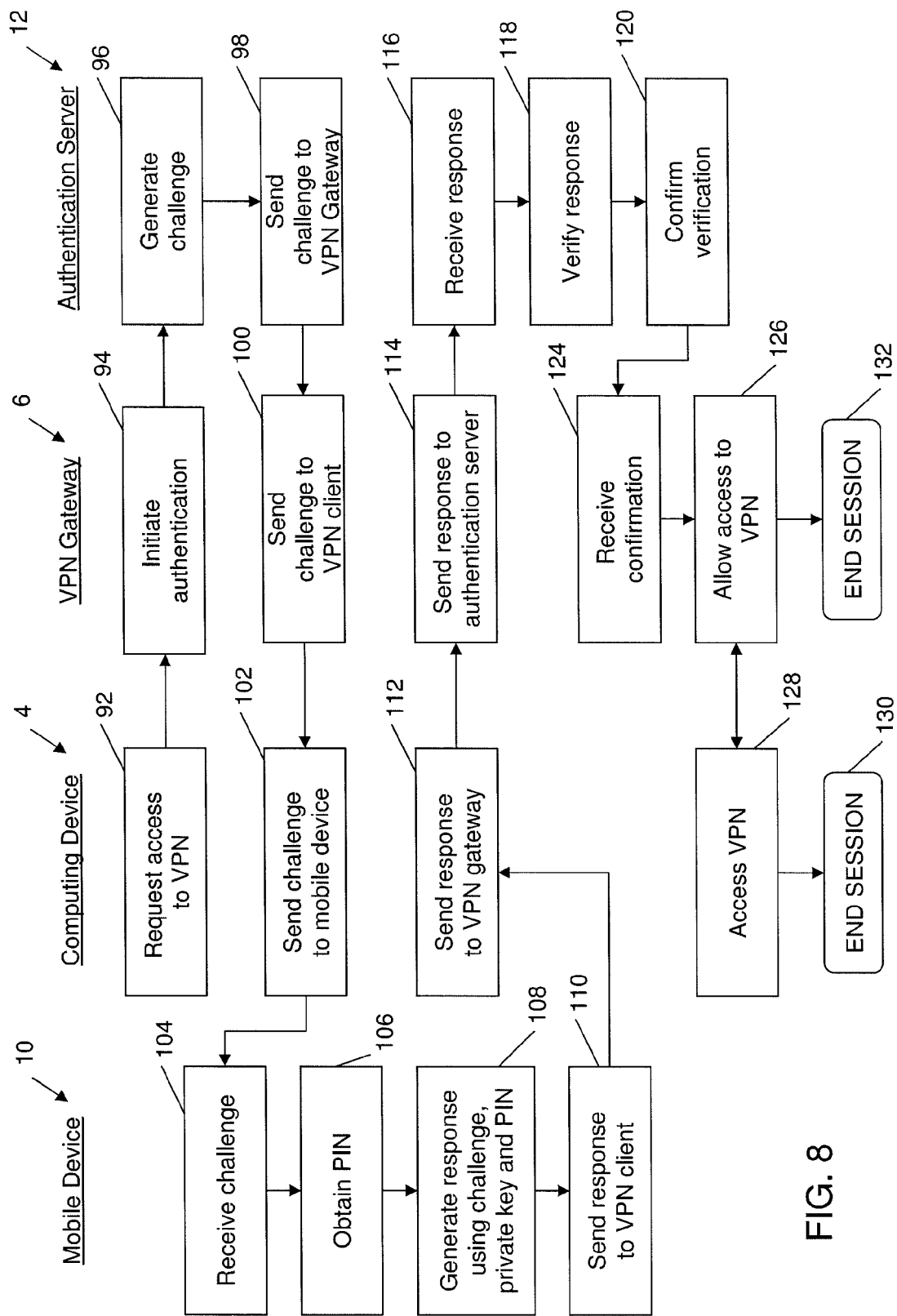
FIG. 8 is a flow chart illustrating an example set of computer executable operations that may be performed in authenticating access to a private network according to the communication system shown in FIG. 2.

FIG. 8 provides an example of a set of computer executable operations that may be performed in authenticating access to a private network 2 according to the communication system shown in FIG. 2. At 92, the VPN client 20 of the computing device 4 requests access to the private network 2. The VPN gateway 6 receives the request and in addition to establishing a secure channel with the VPN client 20, initiates authentication of a user associated with the request at 94. The authentication server 12 after detecting a request to initiate an authentication initiates a challenge/response protocol by generating a challenge at 96, e.g. by generating a random number. The authentication server 12 then sends the challenge to the VPN gateway 6 at 98 to have the VPN gateway 6 send the challenge to the VPN client 20 on the computing device 4 at 100. The computing device 4, via a connection established with the mobile device 10, sends the challenge to the cryptographic module 18 on the mobile device 10 at 102 and the mobile device 10 receives the challenge at 104.

The mobile device 10 after receiving the challenge at 104 obtains the PIN 30 from the user at 106, e.g. by requesting entry of the PIN 30 through the authentication UI 50 as discussed above. The cryptographic module 18 may then generate a response at 108 using the challenge, the private key a, and the PIN 30 obtained at 106. For example, the response may include a signature on the challenge, wherein the challenge is signed using the private key a and the PIN 30 and may include additional information such as a timestamp. The response is then sent at 110 to the VPN client 20 on the computing device 4 to have the VPN client 20 send the response to the VPN gateway 6 at 112. The VPN gateway 6 then sends the response to the authentication server 12 at 114. The response is received by the authentication server 12 at 116, and the response is verified at 118 by the cryptographic module 42 on the authentication server 12. For example, the signature on the challenge may be verified using a verification scheme that is complementary to the signing scheme used by the cryptographic module 18 on the mobile device 10. If the response can be verified at 118, the authentication server 12 may then confirm the verification with the VPN gateway 6 at 120. The VPN gateway 6 after receiving such confirmation at 124 allows access to the private network 2 at 126 for the user being authenticated using the mobile device 10. The VPN client 20 may then access the private network 2 at 128 and such access may persist until the session ends at 130 and 132.

Figure 9:
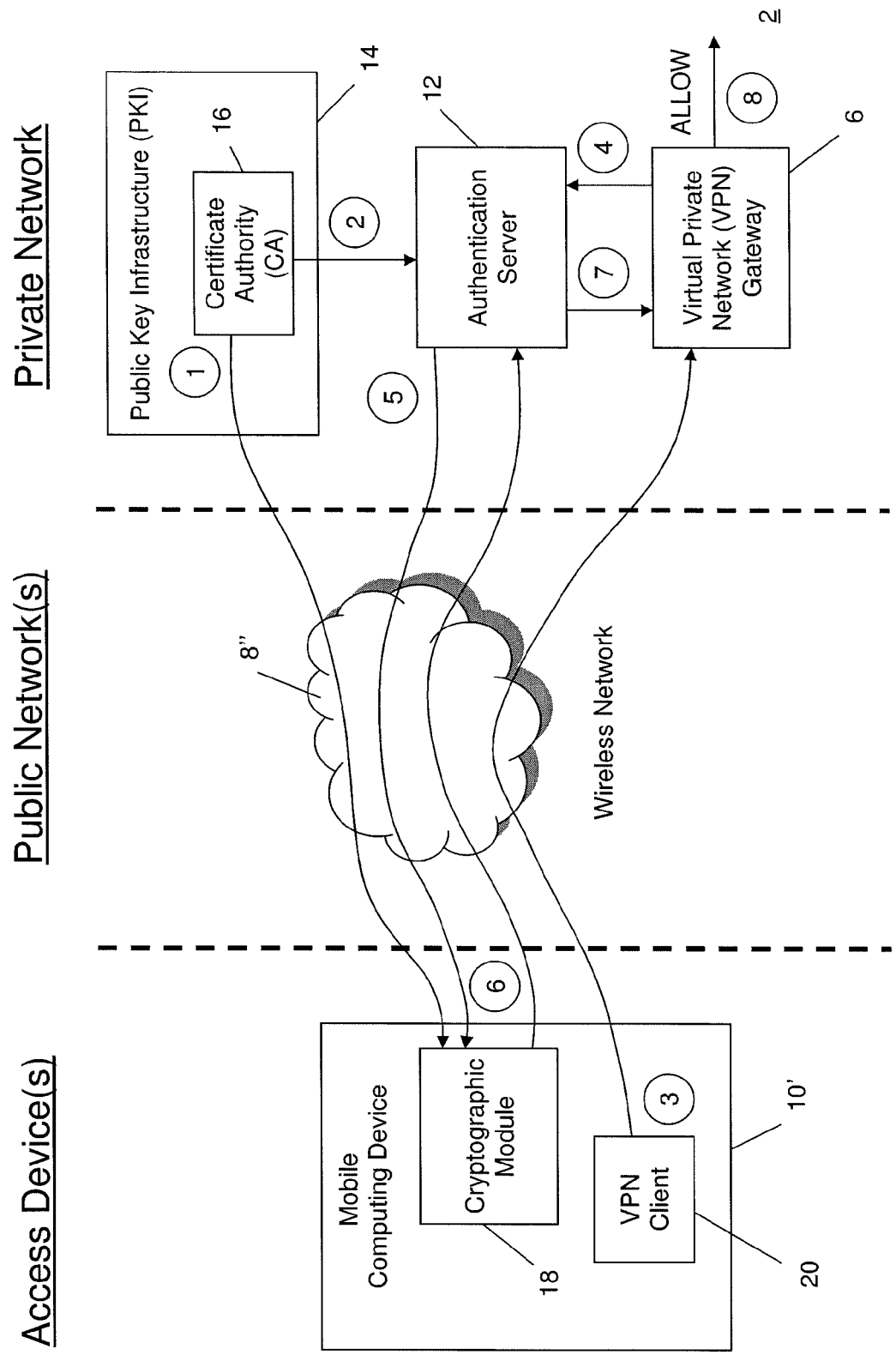
FIG. 9 is a schematic diagram of a communication system for accessing a private network using a mobile device accessible over a public network, the mobile device including both a cryptographic module and a VPN client.

Another example is shown in FIG. 9, in which a mobile computing device 10' is used to both authenticate the user and access the private network 2 using a VPN client 20. It can be appreciated that the example shown in FIG. 9 is particularly suitable for wireless-enabled devices that are also used to provide remote access to a private network 2, e.g. a tablet computer. It can be seen in FIG. 9 that the mobile computing device 10' includes both a cryptographic module 18 and a VPN client 20 and, in the example scenario shown, is communicable over a public wireless network 8". As discussed above, the private/public key pair (a, A) may be provisioned at stage 1 over the wireless network 8". The public key may be provided to the authentication server 12, e.g. using a CA 16, similar to that described above. The VPN client 20 on the mobile computing device 10' requests access to the private network 2 over the wireless network 8" in stage 3, by establishing a secure channel with the VPN gateway 6. Stages 4, 5, 6, 7, and 8 then proceed in a manner similar to that described above with respect to FIG. 1, with the challenge and response being exchanged with the same device as that having the VPN client 20 making the request to access the private network 2.

Figure 10:
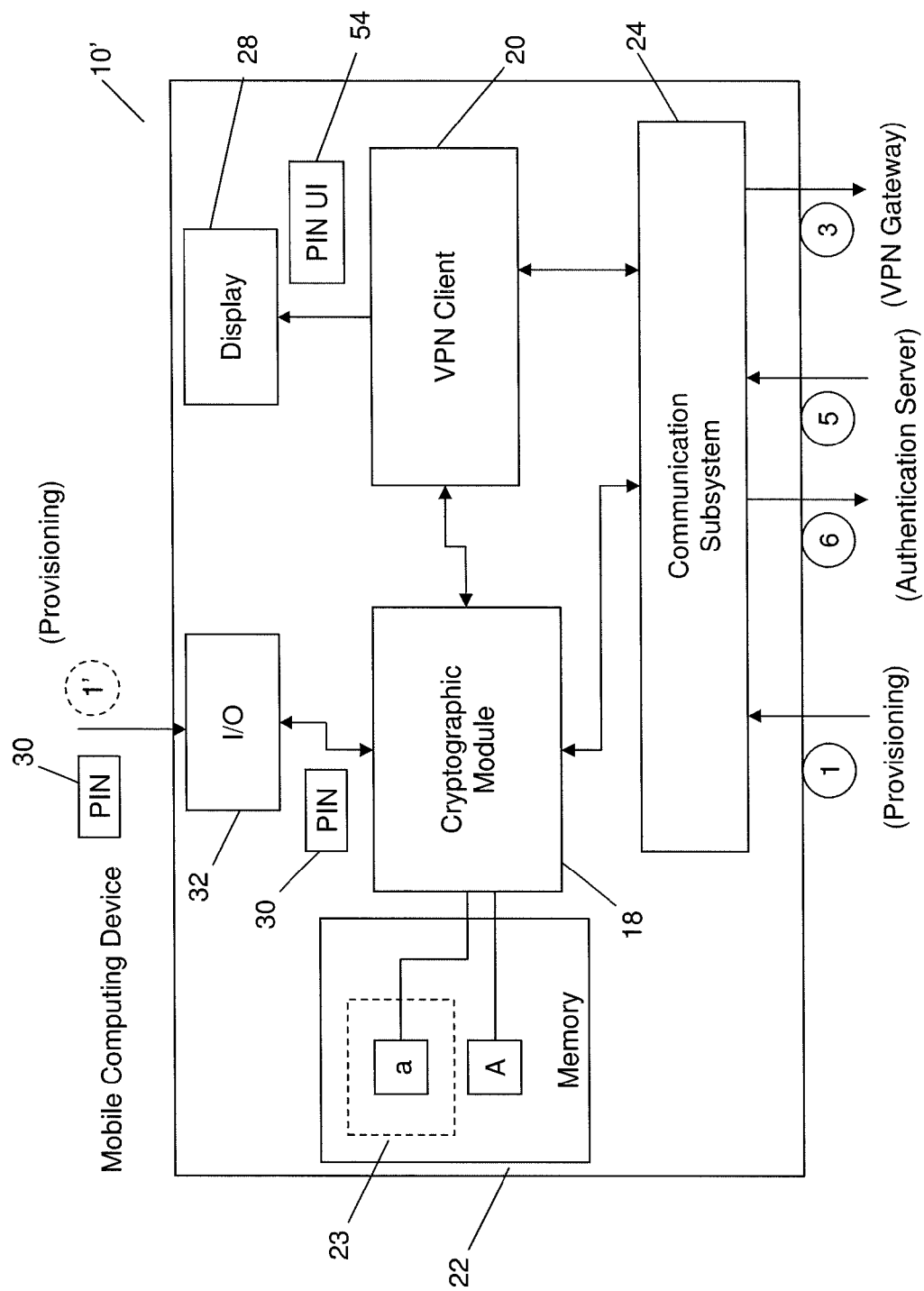
FIG. 10 is a block diagram illustrating an example configuration for a mobile device including both a cryptographic module and a VPN client.

An example of a configuration for a mobile computing device 10' having both a cryptographic module 18 and a VPN client 20 is shown in FIG. 10. In the example shown in FIG. 10, a communication subsystem 24 is shown for communicating with the VPN gateway 6, the authentication server 12, and the CA 16 over the wireless network 8". It can be appreciated, however, that more than one communication subsystem 24 may be used. Similar to the example shown in FIG. 3, the cryptographic module 18 includes or otherwise has access to at least a portion of memory 22. The memory 22 in this example stores the public key A and has a secure area 23 for storing the private key a. The cryptographic module 18 can therefore access both the private key a and the public key A for performing cryptographic operations utilizing such keys. The mobile computing device 10' in this example includes a display module 28 that enables the cryptographic module 18 to request entry of the PIN 30 through, for example, a PIN UI 54 provided to the display module 28 by the VPN client 20. The mobile computing device 10' also includes one or more I/O modules 32 (one shown in FIG. 10 for ease of illustration). Similar to the configuration shown in FIG. 3, the I/O module 32 shown in FIG. 10 may represent any input mechanism such as a keyboard, shortcut key, data port, memory slot, etc. The I/O module 32 can also, in some examples, be utilized for provisioning the private/public key pair on the mobile device 10.

Figure 11:
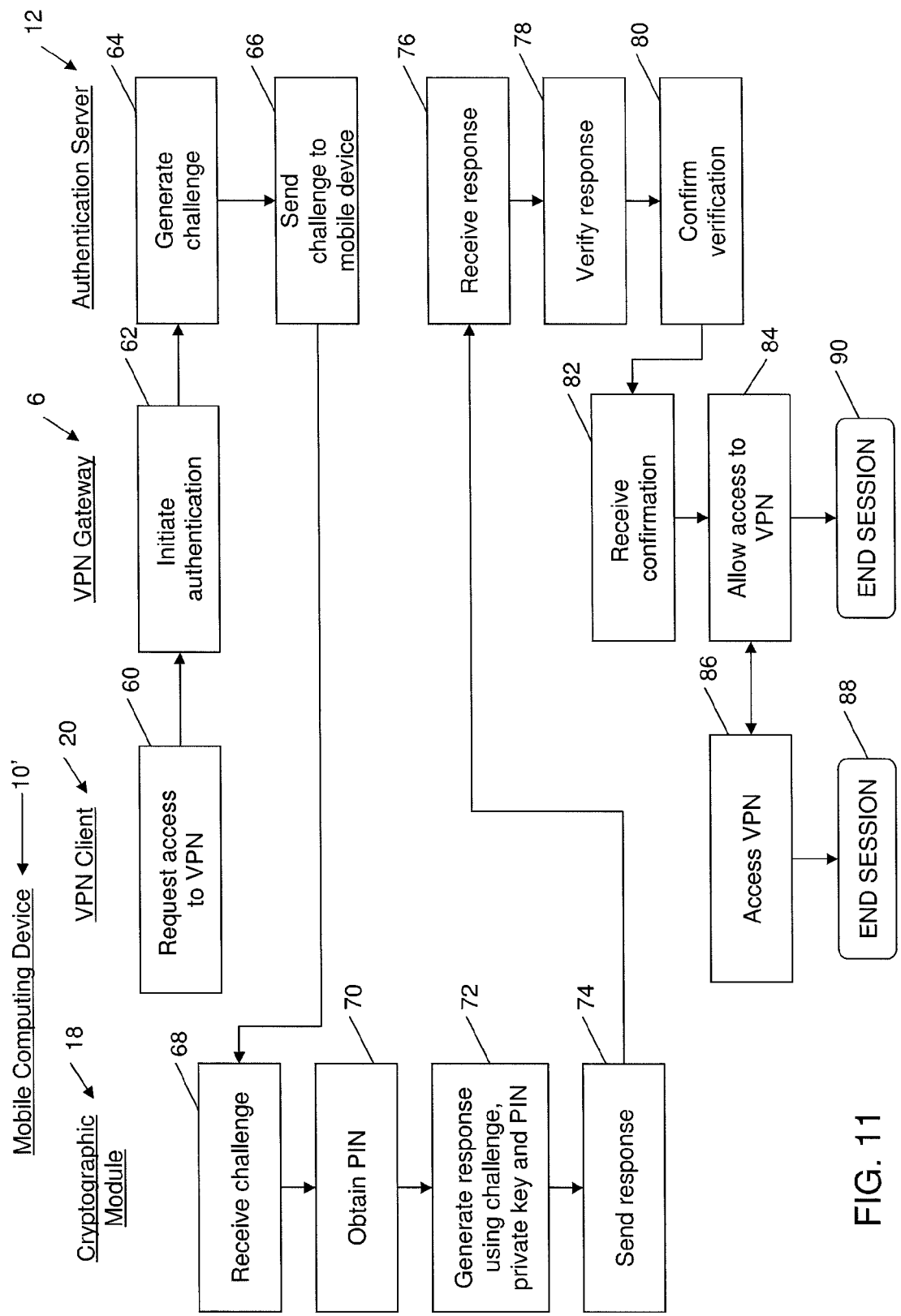
FIG. 11 is a flow chart illustrating an example set of computer executable operations that may be performed in authenticating access to a private network according to the communication system shown in FIG. 10.

FIG. 11 provides an example of a set of computer executable operations that may be performed in authenticating access to a private network according to the communication system in FIG. 10. It can be appreciated that the operations shown in FIG. 11 are the same as those shown in FIG. 7 and thus need not be repeated. However, it may be noted that the operations performed by the cryptographic module 18 and VPN client 20 are performed by the same mobile computing device 10' in this example, as shown in FIG. 11.

In another example, the mobile device 10 may be used in a system that is configured for continuously routing all forms of pushed information from a host system 250 (e.g. within an enterprise or otherwise private environment 220) to the mobile device 10. One example of such a system will now be described making reference to FIG. 12.

Figure 12:
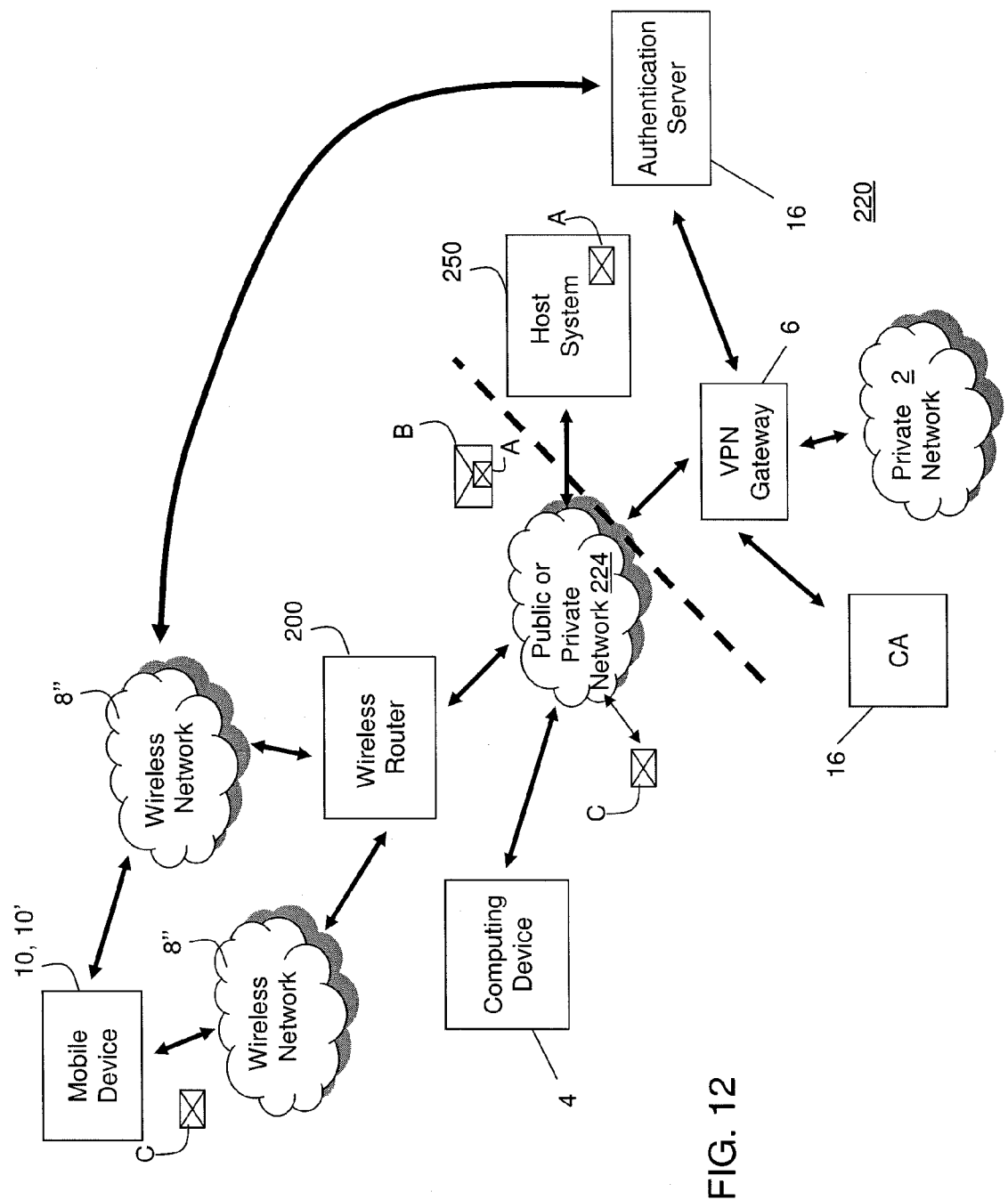
FIG. 12 is a system diagram illustrating an environment in which data items are pushed from a host system to a mobile device, a router in such environment or the host system comprising a registrar.

FIG. 12 is an example system diagram showing the redirection of user data items (such as message A or C) from a corporate enterprise computer system (host system) 250 to the user's mobile device 10 via a wireless router 200. The wireless router 200 provides the wireless connectivity functionality as it acts to both abstract most of the wireless network's 8" complexities, and also implements features necessary to support pushing data to the mobile device 10. Although not shown, a plurality of mobile devices may access data from the host system 250. In this example, message A in FIG. 12 represents an internal message sent from, e.g. a desktop computer (not shown) within the host system 250, to any number of server computers in a corporate network (e.g. LAN), which may, in general, include a database server, a calendar server, an E-mail server, a voice-mail server, etc.

As can be seen in FIG. 12, the private or enterprise environment 220 may include a host system 250 in addition to the VPN gateway 6, CA 16, and authentication server 16. It can be appreciated that the CA 16 may be included in an enterprise-wide PKI 14 or other existing PKI 14 used by the host system 250.

Message C in FIG. 12 represents an external message from a sender that is not directly connected to the host system 250, such as the user's mobile device 10, some other user's mobile device (not shown), or any user connected to the public or private network 224 (e.g. the Internet). Message C could be e-mail, voice-mail, an instant message (IM), calendar information, database updates, web-page updates or could even represent a command message from the user's mobile device 10 to the host system 250. The host system 250 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 10 may be configured for communication within wireless network 8" via wireless links, as required by each wireless network 8" being used. As an illustrative example of the operation for a wireless router 200 shown in FIG. 12, consider a data item A, repackaged in outer envelope B (the packaged data item A now referred to as "data item (A)") and sent to the mobile device 10 from an Application Service Provider (ASP) in the host system 250. Within the ASP is a computer program, similar to a wireless mobility agent, running on any computer in the ASP's environment that is sending requested data items from a data store to a mobile device 10. The mobile-destined data item (A) is routed through the network 224, and through the wireless router's firewall (not shown) protecting the wireless router 200.

Although the above describes the host system 250 as being used within a corporate enterprise network environment, this is just one example of one type of host service that offers push-based messages for a handheld wireless device that is capable of notifying and preferably presenting the data to the user in real-time at the mobile device when data arrives at the host system 250.

By offering a wireless router 200 (sometimes referred to as a "relay"), there are a number of major advantages to both the host system 250 and the wireless network 8". The host system 250 in general can run a host service that is considered to be any computer program that is running on one or more computer systems. The host service may be said to be running on a host system 250, and one host system 250 can support any number of host services. A host service may or may not be aware of the fact that information is being channeled to mobile devices 10. For example an e-mail or message program might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 200, like customer relationship management software. In a third example, there might be a common access to a range of host services. For example a mobility agent might offer a Wireless Access Protocol (WAP) connection to several databases.

In data messaging environments, the wireless router 200 may abstract the mobile device 10 and wireless network 8", offer push services to standard web-based server systems and allow a host service in a host system 250 to reach the mobile device 10 in many countries.

The host system 250 shown herein has many methods when establishing a communication link to the wireless router 200. For one skilled in the art of data communications the host system 250 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 250 that might employ the wireless router 200 to perform push could include: field service applications, e-mail services, IM services, stock quote services, banking services, stock trading services, field sales applications, advertising messages and many others. This wireless network 8" abstraction is made possible by the wireless router 200, which implements this routing and push functionality. The type of user-selected data items being exchanged by the host could include: E-mail messages, instant messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 200 may provide a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like Enhanced Data Rates for GSM Evolution (EDGE), Universal Mobile Telecommunications System (UMTS) and High-Speed Downlink Packet Access (HSDPA), Long Term Evolution (LTE), Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 250, the wireless router 200 may implement a set of defined functions. It can be appreciated that one could select many different hardware configurations for the wireless router 200, however, many of the same or similar set of features would likely be present in the different configurations.

Figure 13:
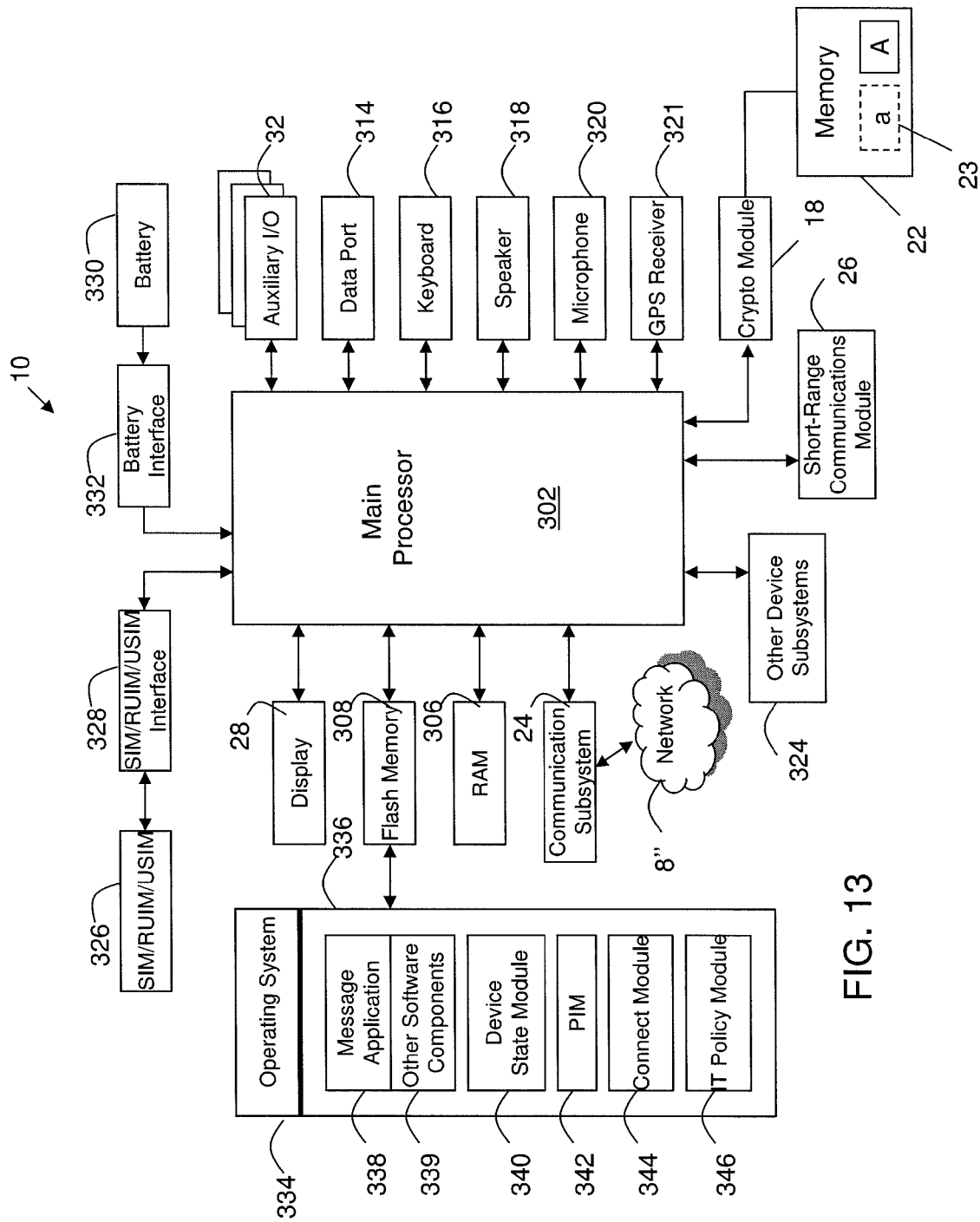
FIG. 13 is a block diagram of an example configuration for a mobile device.

Referring now to FIG. 13, shown therein is a block diagram of an example of a configuration of a mobile device 10. The mobile device 10 comprises a number of components such as a main processor 20 that controls the overall operation of the mobile device 10. Communication functions, including data and voice communications, are performed through a communication subsystem 24. The communication subsystem 24 receives messages from and sends messages to a wireless network 8". In this example of the mobile device 10, the communication subsystem 24 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behavior described herein, and it will also be understood by persons skilled in the art that the examples described herein are intended to use any other suitable standards that are developed in the future. The wireless link connecting the communication subsystem 24 with the wireless network 8" represents one or more different Radio Frequency (RF) channels, operating according to defined protocols specified for GSM/GPRS communications. With newer network protocols, these channels are capable of supporting both circuit switched voice communications and packet switched data communications.

The main processor 20 also interacts with additional subsystems such as a Random Access Memory (RAM) 306, a flash memory 308, a display 28, an auxiliary input/output (I/O) subsystem 32, a data port 314, a keyboard 316, a speaker 318, a microphone 320, GPS receiver 321, short-range communications module 26 and other device subsystems 324.

Also shown in FIG. 13 is a cryptographic module 18 and memory 22 storing the public key A and having a secure location for storing the private key a.

Some of the subsystems of the mobile device 10 perform communication-related functions, whereas other subsystems may provide "resident" or on-device functions. By way of example, the display 28 and the keyboard 316 may be used for both communication-related functions, such as entering a text message for transmission over the wireless network 8", and device-resident functions such as a calculator or task list.

The mobile device 10 can send and receive communication signals over the wireless network 8" after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 326 is to be inserted into a SIM/RUIM/USIM interface 328 in order to communicate with a network. The SIM/RUIM/USIM component 326 is one type of a conventional "smart card" that can be used to identify a subscriber of the mobile device 10 and to personalize the mobile device 10, among other things. Without the component 326, the mobile device 10 may not be fully operational for communication with the wireless network 8". By inserting the SIM/RUIM/USIM 326 into the SIM/RUIM/USIM interface 328, a subscriber can access all subscribed services. Services may include: web browsing and messaging such as e-mail, voice mail, SMS, and MMS. More advanced services may include: point of sale, field service and sales force automation. The SIM/RUIM/USIM 326 includes a processor and memory for storing information. Once the SIM/RUIM/USIM 326 is inserted into the SIM/RUIM/USIM interface 328, it is coupled to the main processor 20. In order to identify the subscriber, the SIM/RUIM/USIM 326 can include some user parameters such as an International Mobile Subscriber Identity (IMSI). An advantage of using the SIM/RUIM/USIM 326 is that a subscriber is not necessarily bound by any single physical mobile device. The SIM/RUIM/USIM 326 may store additional subscriber information for a mobile device as well, including datebook (or calendar) information and recent call information. Alternatively, user identification information can also be programmed into the flash memory 308.

The mobile device 10 is typically a battery-powered device and includes a battery interface 332 for receiving one or more batteries 330 (typically rechargeable). In at least some examples, the battery 330 can be a smart battery with an embedded microprocessor. The battery interface 332 is coupled to a regulator (not shown), which assists the battery 330 in providing power V+ to the mobile device 10. Although current technology makes use of a battery, future technologies such as micro fuel cells may provide the power to the mobile device 10.

The mobile device 10 also includes an operating system 334 and software components 336 to 346 which are described in more detail below. The operating system 334 and the software components 336 to 346 that are executed by the main processor 20 are typically stored in a persistent store such as the flash memory 308, which may alternatively be a read-only memory (ROM) or similar storage element (not shown). Those skilled in the art will appreciate that portions of the operating system 334 and the software components 336 to 346, such as specific device applications, or parts thereof, may be temporarily loaded into a volatile store such as the RAM 306. Other software components can also be included.

The subset of software applications 336 that control basic device operations, including data and voice communication applications, may be installed on the mobile device 10 during its manufacture. Other software applications include a message application 338 that can be any suitable software program that allows a user of the mobile device 10 to send and receive electronic messages. Various alternatives exist for the message application 338 as is well known to those skilled in the art. Messages that have been sent or received by the user are typically stored in the flash memory 308 of the mobile device 10 or some other suitable storage element in the mobile device 10. In at least some examples, some of the sent and received messages may be stored remotely from the mobile device 10 such as in a data store of an associated host system that the mobile device 10 communicates with.

The software applications can further comprise a device state module 340, a Personal Information Manager (PIM) 342, and other suitable modules (not shown). The device state module 340 provides persistence, i.e. the device state module 340 ensures that important device data is stored in persistent memory, such as the flash memory 308, so that the data is not lost when the mobile device 10 is turned off or loses power.

The PIM 342 includes functionality for organizing and managing data items of interest to the user, such as, but not limited to, e-mail, contacts, calendar events, voice mails, appointments, and task items. A PIM application has the ability to send and receive data items via the wireless network 8". PIM data items may be seamlessly integrated, synchronized, and updated via the wireless network 8" with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 344, and an IT policy module 346. The connect module 344 implements the communication protocols that are required for the mobile device 10 to communicate with the wireless infrastructure and any host system, such as an enterprise system, that the mobile device 10 is authorized to interface with.

The connect module 344 includes a set of APIs that can be integrated with the mobile device 10 to allow the mobile device 10 to use any number of services associated with the enterprise system. The connect module 344 allows the mobile device 10 to establish an end-to-end secure, authenticated communication pipe with a host system (not shown). A subset of applications for which access is provided by the connect module 344 can be used to pass IT policy commands from the host system to the mobile device 10. This can be done in a wireless or wired manner. These instructions can then be passed to the IT policy module 346 to modify the configuration of the device 10. Alternatively, in some cases, the IT policy update can also be done over a wired connection.

The IT policy module 346 receives IT policy data that encodes the IT policy. The IT policy module 346 then ensures that the IT policy data is authenticated by the mobile device 10. The IT policy data can then be stored in the flash memory 306 in its native form. After the IT policy data is stored, a global notification can be sent by the IT policy module 346 to all of the applications residing on the mobile device 10. Applications for which the IT policy may be applicable then respond by reading the IT policy data to look for IT policy rules that are applicable.

Other types of software applications or components 339 can also be installed on the mobile device 10. These software applications 339 can be pre-installed applications (i.e. other than message application 26') or third party applications, which are added after the manufacture of the mobile device 10. Examples of third party applications include games, calculators, utilities, etc.

The additional applications 339 can be loaded onto the mobile device 10 through at least one of the wireless network 8", the auxiliary I/O subsystem 32, the data port 314, the short-range communications subsystem 322, or any other suitable device subsystem 324. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 314 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 314 can be any suitable port that enables data communication between the mobile device 10 and another computing device. The data port 314 can be a serial or a parallel port. In some instances, the data port 314 can be a USB port that includes data lines for data transfer and a supply line that can provide a charging current to charge the battery 330 of the mobile device 10.

The short-range communications module 26 provides for communication between the mobile device 10 and different systems or devices, without the use of the wireless network 8". For example, the subsystem 26 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 24 and input to the main processor 20. The main processor 20 may then process the received signal for output to the display 28 or alternatively to the auxiliary I/O subsystem 32. A subscriber may also compose data items, such as e-mail messages, for example, using the keyboard 316 in conjunction with the display 28 and possibly the auxiliary I/O subsystem 32. The auxiliary I/O subsystem 32 may comprise devices such as: a touch screen, mouse, track ball, infrared fingerprint detector, or a roller wheel with dynamic button pressing capability. The keyboard 316 is an alphanumeric keyboard and/or telephone-type keypad. However, other types of keyboards may also be used, such as a virtual or "soft" keyboard rendered as images on a touch screen. A composed item may be transmitted over the wireless network 8" through the communication subsystem 24.

For voice communications, the overall operation of the mobile device 10 in this example is substantially similar, except that the received signals are output to the speaker 318, and signals for transmission are generated by the microphone 320. Alternative voice or audio I/O subsystems, such as a voice message recording subsystem, can also be implemented on the mobile device 10. Although voice or audio signal output is accomplished primarily through the speaker 318, the display 28 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the private network 2, etc., or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Accordingly, there is provided a method of operating a mobile device, the method comprising: receiving a challenge from an authentication server, the challenge having being generated according to a request to access a private network; obtaining a private value; using the private value, the challenge, and a private key to generate a response to the challenge; and sending the response to the authentication server.

There may also be provided a computer readable medium and mobile device configured to perform the above method.

There may also be provided a method of operating an authentication server, the method comprising: generating a challenge; sending the challenge to a mobile device; receiving a response from the mobile device, the response having been generated by the mobile device using a private value, the challenge, and a private key; verifying the response; and confirming verification of the response with a virtual private network gateway to permit a computing device to access a private network.

There may also be provided a computer readable medium and mobile device configured to perform the above method.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of operating a mobile device, the method comprising:
    receiving at the mobile device, a challenge from an authentication server on behalf of a computing device attempting to access a private network, the challenge having been generated in response to a request by the computing device to access the private network;
    obtaining a private value entered by a user, wherein the private value is not accessible by the computing device;
    the mobile device using the private value, the challenge, and a private key stored on the mobile device to generate a response to the challenge; and
    the mobile device sending the response to the authentication server to enable the computing device to access the private network.

2. The method of claim 1, wherein the private value is a personal identification number.

3. The method of claim 1, wherein the challenge is received by the mobile device directly from the authentication server independent of the computing device, and the response is sent directly to the authentication server over a public network independent of the computing device.

4. The method of claim 1, wherein the mobile device is connected to the computing device for generating the response, wherein the challenge is received from the authentication server via a virtual private network gateway on the computing device, and wherein the response is sent to the authentication server via the virtual private network gateway on the computing device.

5. The method of claim 1, wherein the response comprises a signature generated using the challenge, the private key, and the private value.

6. A non-transitory computer readable storage medium comprising computer executable instructions for operating a mobile device, the computer executable instructions comprising instructions for:
    receiving at the mobile device, a challenge from an authentication server on behalf of a computing device attempting to access a private network, the challenge having been generated in response to a request by the computing device to access the private network;
    obtaining a private value entered by a user, wherein the private value is not accessible by the computing device;

the mobile device using the private value, the challenge, and a private key stored on the mobile device to generate a response to the challenge; and the mobile device sending the response to the authentication server to enable the computing device to access the private network.

7. The non-transitory computer readable storage medium of claim 6, wherein the private value is a personal identification number.

8. The non-transitory computer readable storage medium of claim 6, wherein the challenge is received by the mobile device directly from the authentication server independent of the computing device, and the response is sent directly to the authentication server over a public network independent of the computing device.

9. The non-transitory computer readable storage medium of claim 6, wherein the mobile device is connected to the computing device for generating the response, wherein the challenge is received from the authentication server via a virtual private network gateway on the computing device, and wherein the response is sent to the authentication server via the virtual private network gateway on the computing device.

10. The non-transitory computer readable storage medium of claim 6, wherein the response comprises a signature generated using the challenge, the private key, and the private value.

11. A mobile device comprising a processor, and memory, the memory comprising computer executable instructions for causing the processor to:

receive at the mobile device, a challenge from an authentication server on behalf of a computing device attempting to access a private network, the challenge having been generated in response to a request by the computing device to access the private network;

obtain a private value entered by a user, wherein the private value is not accessible by the computing device;

use the private value, the challenge, and a private key stored on the mobile device to generate a response to the challenge; and send the response to the authentication server to enable the computing device to access the private network.

12. A method of operating an authentication server, the method comprising:

generating a challenge in response to a request from a computing device to access a private network;

sending the challenge to a mobile device on behalf of the computing device attempting to access the private network;

receiving a response from the mobile device, the response having been generated by the mobile device using a private value entered by a user, the challenge, and a private key stored on the mobile device, wherein the private value is not accessible by the computing device;

verifying the response; and confirming verification of the response with a virtual private network gateway to permit the computing device to access the private network.

13. The method of claim 12, wherein the private value is a personal identification number.

14. The method of claim 12, wherein the challenge is sent directly to the mobile device independent of the computing device, and the response is received directly from the mobile device over a public network independent of the computing device.

15. The method of claim 12, wherein the mobile device is connected to the computing device for generating the response, wherein the challenge is sent to the mobile device via the virtual private network gateway on the computing device, and wherein the response is received from the mobile device via the virtual private network gateway on the computing device.

16. The method of claim 12, wherein the response comprises a signature generated using the challenge, the private key, and the private value.

17. A non-transitory computer readable storage medium comprising computer executable instructions for operating an authentication server, the computer executable instructions comprising instructions for:

generating a challenge in response to a request from a computing device to access a private network;

sending the challenge to a mobile device on behalf of the computing device attempting to access the private network;

receiving a response from the mobile device, the response having been generated by the mobile device using a private value entered by a user, the challenge, and a private key stored on the mobile device, wherein the private value is not accessible by the computing device;

verifying the response; and confirming verification of the response with a virtual private network gateway to permit the computing device to access the private network.

18. The non-transitory computer readable storage medium of claim 17, wherein the private value is a personal identification number.

19. The non-transitory computer readable storage medium of claim 17, wherein the challenge is sent directly to the mobile device independent of the computing device, and the response is received directly from the mobile device over a public network independent of the computing device.

20. The non-transitory computer readable storage medium of claim 17, wherein the mobile device is connected to the computing device for generating the response, wherein the challenge is sent to the mobile device via the virtual private network gateway on the computing device, and wherein the response is received from the mobile device via the virtual private network gateway on the computing device.

21. The non-transitory computer readable storage medium of claim 17, wherein the response comprises a signature generated using the challenge, the private key, and the private value.

22. An authentication server comprising a processor and memory, the memory comprising computer executable instructions for causing the processor to:

generate a challenge in response to a request from a computing device to access a private network;

send the challenge to a mobile device on behalf of the computing device attempting to access the private network;

receive a response from the mobile device, the response having been generated by the mobile device using a private value entered by a user, the challenge, and a private key stored on the mobile device, wherein the private value is not accessible by the computing device;

verify the response; and confirm verification of the response with a virtual private network gateway to permit the computing device to access the private network.

* * * * *